US011118069B1

(12) United States Patent
Risbud Bartl et al.

(10) Patent No.: US 11,118,069 B1
(45) Date of Patent: Sep. 14, 2021

(54) SURFACE-STRUCTURED COATINGS

(71) Applicant: HRL Laboratories, LLC, Malibu, CA (US)

(72) Inventors: Michael H. Risbud Bartl, Salt Lake City, UT (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 327 days.

(21) Appl. No.: 15/896,457

(22) Filed: Feb. 14, 2018

Related U.S. Application Data

(62) Division of application No. 14/505,785, filed on Oct. 3, 2014, now Pat. No. 9,976,039.

(Continued)

(51) Int. Cl.
*C09D 5/16* (2006.01)
*C09D 5/00* (2006.01)
(Continued)

(52) U.S. Cl.
CPC ............. *C09D 5/006* (2013.01); *B05D 3/007* (2013.01); *C09D 109/00* (2013.01);
(Continued)

(58) Field of Classification Search
CPC ........ B05D 3/007; G03F 7/0037; G03F 7/004
See application file for complete search history.

(56) References Cited

U.S. PATENT DOCUMENTS

| | | | |
|---|---|---|---|
| 7,361,472 B2 * | 4/2008 | Yguerabide | C12Q 1/6816 356/300 |
| 7,382,959 B1 | 6/2008 | Jacobsen | |

(Continued)

OTHER PUBLICATIONS

Mishchenko et al., "Design of Ice-Free Nanostructured Surfaces Based on Repulsion of impacting Water Droplets", ACS Nano 4 (2010) 7699-7007.

(Continued)

*Primary Examiner* — Dah-Wei D. Yuan
*Assistant Examiner* — Kristen A Dagenais-Englehart
(74) *Attorney, Agent, or Firm* — O'Connor & Company

(57) ABSTRACT

We describe a new approach to fabricate polymeric materials with surface structures for applications as anti-reflective, anti-icing, superhydrophobic, superhydrophilic, de-wetting, and self-cleaning coatings. In some variations, a surface-textured layer comprises first microdomains and second microdomains each containing polymerized cross-linkable photomonomer, where the first microdomains have a higher average cross-link density than that of the second microdomains. The first microdomains and the second microdomains are in a peak-valley surface topology, providing surface texture with no filler particles. In some variations, a method to fabricate a surface-textured layer comprises: applying a cross-linkable photomonomer layer to a reflective substrate; exposing the photomonomer layer to a collimated light beam with no spatial variation, to initiate polymerization in first microdomains; and polymerizing other regions of the photomonomer layer to form second microdomains that are spatially separated from the first microdomains. The first microdomains have a higher average cross-link density compared to the second microdomains.

12 Claims, 6 Drawing Sheets

Related U.S. Application Data

(60) Provisional application No. 61/887,077, filed on Oct. 4, 2013.

(51) Int. Cl.

| | |
|---|---|
| *C09D 139/06* | (2006.01) |
| *C09D 139/04* | (2006.01) |
| *C09D 133/26* | (2006.01) |
| *C09D 133/20* | (2006.01) |
| *C09D 133/10* | (2006.01) |
| *C09D 133/08* | (2006.01) |
| *C09D 133/04* | (2006.01) |
| *C09D 125/06* | (2006.01) |
| *C09D 109/00* | (2006.01) |
| *C09D 123/28* | (2006.01) |
| *C09D 123/06* | (2006.01) |
| *C09D 123/02* | (2006.01) |
| *B05D 3/00* | (2006.01) |

(52) U.S. Cl.
CPC ......... *C09D 123/02* (2013.01); *C09D 123/06* (2013.01); *C09D 123/28* (2013.01); *C09D 125/06* (2013.01); *C09D 133/04* (2013.01); *C09D 133/08* (2013.01); *C09D 133/10* (2013.01); *C09D 133/20* (2013.01); *C09D 133/26* (2013.01); *C09D 139/04* (2013.01); *C09D 139/06* (2013.01)

(56) References Cited

U.S. PATENT DOCUMENTS

| | | |
|---|---|---|
| 2007/0031639 A1 | 2/2007 | Hsu et al. |
| 2009/0186306 A1* | 7/2009 | Haraldsson ........... B29C 64/135 430/322 |
| 2010/0044913 A1 | 2/2010 | Etori |
| 2011/0068494 A1* | 3/2011 | Wilson .................. B82Y 10/00 264/1.27 |
| 2011/0104445 A1* | 5/2011 | Hermans ................ G03F 7/027 428/156 |
| 2015/0153642 A1* | 6/2015 | Yang .................. B81C 1/00031 430/11 |

OTHER PUBLICATIONS

Krupenkin et al., "Reversible Wetting-Dewetting Transitions on Electrically Tunable Superhydrophobic Nanostructured Surfaces", Langmuir 23 (2007) 9128-9133.
Park et al., "Nanotextured Silica Surfaces with Robust Superhydrophobicity and Omnidirectional Broadband Supertransmissivity", ACS Nano 6 (2012) 3789-3799.
Matsumoto, "Free-radical crosslinking polymerization and copolymerization of multivinyl compounds," Advances in Polymer Science, vol. 123 (1995).
Cao et al., "Anti-icing superhydrophobic coatings," Langmuir (2009), DOI: 10.1021/la902882b.
Zhai et al., "Stable Superhydrophobic Coatings from Polyelectrolyte Multilayers," Nano Lett., vol. 4, No. 7, 2004.

* cited by examiner

SURFACE-STRUCTURED COATINGS

PRIORITY DATA

This patent application is a divisional application of U.S. patent application Ser. No. 14/505,785, filed on Oct. 3, 2014, which claims priority to U.S. Provisional Patent App. No. 61/887,077, filed on Oct. 4, 2013, each of which is hereby incorporated by reference herein in its entirety.

FIELD OF THE INVENTION

The present invention generally relates to structured and textured coatings for various commercial applications.

BACKGROUND OF THE INVENTION

Functional coatings are very important in industry and the consumer marketplace today. There can be many reasons for coatings, ranging from performance for intended applications, to safety considerations, to total part costs (e.g., utilizing specialized materials for exposed surfaces rather than entire bulk objects).

Functional performance properties that are currently desired include anti-reflective, anti-icing, superhydrophobic, superhydrophilic, de-wetting, and self-cleaning properties. Anti-icing (or ice-repellent) coatings can have significant impact on improving safety in many infrastructure, transportation, and cooling systems. Among numerous problems caused by icing, many are due to striking of supercooled water droplets onto a solid surface. Such icing caused by supercooled water, also known as freezing rain, atmospheric icing, or impact ice, is notorious for glazing roadways, breaking tree limbs and power lines, and stalling airfoil of aircrafts.

When supercooled water impacts surfaces, icing may occur through a heterogeneous nucleation process at the contact between water and the particles exposed on the surfaces. Icing of supercooled water on surfaces is a complex phenomenon, and it may also depend on ice adhesion, hydrodynamic conditions, the structure of the water film on the surface, and the surface energy of the surface (how well the water wets it).

Melting-point-depression fluids are well-known as a single-use approach that must be applied either just before or after icing occurs. These fluids (e.g., ethylene or propylene glycol) naturally dissipate under typical conditions of intended use (e.g. aircraft wings, roads, and windshields). These fluids do not provide extended (e.g., longer than about one hour) deicing or anti-icing. Similarly, sprayed Teflon® or fluorocarbon particles affect wetting but are removed by wiping the surface. These materials are not durable.

Recent efforts for developing anti-icing or ice-phobic surfaces have been mostly devoted to utilize lotus leaf-inspired superhydrophobic surfaces. These surfaces fail in high humidity conditions, however, due to water condensation and frost formation, and even lead to increased ice adhesion due to a large surface area.

Superhydrophobicity, characterized by the high contact angle and small hysteresis of water droplets, on surfaces has been attributed to a layer of air pockets formed between water and a rough substrate. Many investigators have thus produced high contact angle surfaces through combinations of hydrophobic surface features combined with roughness or surface texture. One common method is to apply lithographic techniques to form regular features on a surface. This typically involves the creation of a series of pillars or posts that force the droplet to interact with a large area fraction of air-water interface. However, surface features such as these are not easily scalable due to the lithographic techniques used to fabricate them. Also, such surface features are susceptible to impact or abrasion during normal use.

Other investigators have produced coatings capable of freezing-point depression of water. This typically involves the use of small particles which are known to reduce freezing point. Many of these coatings can actually be removed by simply wiping the surface, or through other impacts. Others have introduced melting depressants (salts or glycols) that leech out of surfaces. Once the leeching is done, the coatings do not work as anti-icing surfaces.

Nanoparticle-polymer composite coatings can provide melting-point depression and enable anti-icing, but they do not generally resist wetting of water on the surface. When water is not repelled from the surface, ice layers can still form that are difficult to remove. Even when there is some surface roughness initially, following abrasion the nanoparticles will no longer be present and the coatings will not function effectively as anti-icing surfaces.

Generally, surfaces with anti-reflective, anti-icing, superhydrophobic, superhydrophilic, de-wetting, and self-cleaning properties rely on structural features (ordered or disordered) in the size range of a few nanometers to tens of micrometers. There are various approaches to achieve such surface structural features. Conventional approaches using light to create polymer surface patterns with anti-reflective, anti-icing, de-wetting, self-cleaning, and superhydrophobic/superhydrophilic properties require either a patterned exposure of light (patterning light intensity or polarization) or filler particles that provide the surface topology.

Reactive ion etching methods can be used to create nanopillars on a silicon wafer. A pattern is first formed by using patterned light and/or interference lithography. Pillars are then etched using a reactive ion beam. This method is very expensive and time consuming.

Self-assembly methods are known to form colloidal sphere crystals and inverse crystals. These are multi-step fabrication methods with expensive colloidal spheres as essential building blocks.

Nanoparticle-polymer composite coatings can be fabricated through co-assembly. Nanoparticles need to be pre-fabricated, and the technique is time-consuming and expensive. There is little control over surface structure.

Solvent-based coatings with filler particles are well-known in the coating industry. A surface texture that provides a matte finish is achieved when the solvent evaporates. Filler particles create the surface texture.

There is a need in the art for surface-textured coatings that can be conveniently produced without requiring patterned light during production or filler particles in the final coating product. Such coatings preferably utilize low-cost, lightweight, and environmentally benign materials that can be rapidly (minutes or hours, not days) produced over large areas. These surface-structured coatings should be able to be modified with various chemistries for use in anti-reflective, anti-icing, superhydrophobic, superhydrophilic, de-wetting, and self-cleaning applications.

SUMMARY OF THE INVENTION

The present invention addresses the aforementioned needs in the art, as will now be summarized and then further described in detail below.

In some variations, the invention provides a method to fabricate a surface-textured layer, the method comprising:

(a) applying a cross-linkable photomonomer layer to a reflective substrate;

(b) exposing the photomonomer layer to an exposure beam of photons, to initiate polymerization in a plurality of first microdomains, wherein the exposure beam is a substantially collimated beam with no spatial variation;

(c) continuing to apply the exposure beam to increase cross-link density associated with first microdomains, and to cause at least some polymerization in a plurality of second microdomains that are also within the photomonomer layer but spatially separated from the first microdomains; and (d) recovering a surface-textured layer comprising the first microdomains and the second microdomains, wherein the first microdomains have a higher average cross-link density than that of the second microdomains.

In some embodiments, the exposure beam is vertically incident to the photomonomer layer. In other embodiments, the exposure beam is incident to the photomonomer layer with an angle of incidence less than 90°, such as about 75°, 60°, 35°, 30°, or 15°.

In some embodiments, the method further comprises removing unreacted photomonomer layer following step (b) and/or following step (c). In these or other embodiments, the method further includes removing at least a portion of the second microdomains following step (c). Unreacted photomonomer may be removed by various means, such as solvent extraction, monomer vaporization, or inert gas sweep. Second microdomains may also be removed by various means, such as solvent extraction, hydrolysis, or degradation/vaporization, for example.

In certain embodiments, the method further comprises rinsing out at least some unreacted photomonomer layer and/or at least some of the second microdomains, using an effective solvent, to produce a transparent, anti-glaring surface-textured layer.

Reactive functional groups remain within the photomonomer layer following step (c), in some variations. When functional groups are present, further chemistry may be carried out for desired surface properties. For example, hydrophilic molecules may be attached to the reactive functional groups to produce a superhydrophilic surface-textured layer. In some embodiments, superhydrophobic molecules may be attached to the reactive functional groups to produce a superhydrophobic surface-textured layer. Hydrophobic colloidal particles may be attached to the reactive functional groups to produce an anti-icing surface-textured layer.

The surface-textured layer that is produced by these methods may be a coating itself, or may be part of a coating. In some embodiments, the surface-textured layer is an outer layer of a structural object or a freestanding object.

The present invention also provides unique surface-textured layers. In some variations, a surface-textured layer comprising first microdomains and second microdomains is provided, wherein the surface-textured layer is characterized in that:

the first and the second microdomains contain polymerized cross-linkable photomonomer;

the first microdomains have a higher average cross-link density than that of the second microdomains;

the first microdomains and the second microdomains are disposed in a peak-valley surface topology;

the surface-textured layer has a non-uniform or semi-uniform texture pattern; and the surface-textured layer contains essentially no filler particles.

The non-uniform or semi-uniform texture pattern may be random (i.e., non-ordered), or there may be some degree of uniformity in texture across the surface. In some embodiments, for example, a surface texture pattern within any selected 1 $mm^2$ area is unique and distinct from any other 1 $mm^2$ area.

In some embodiments, the first microdomains have an average length scale from about 0.1 μm to about 100 μm, such as from about 1 μm to about 10 μm. In these or other embodiments, the second microdomains have an average length scale from about 0.1 μm to about 100 μm, such as from about 1 μm to about 10 μm.

The peak-valley surface topology, in some embodiments, includes first microdomains having a first-microdomain average peak height of about 0.01 μm to about 50 μm relative to a second-microdomain average valley depth (i.e., the average distance from top of peak to bottom of valley). In certain embodiments, the first-microdomain average peak height is about 0.5 μm to about 5 μm relative to the second-microdomain average valley depth.

The first microdomains may be substantially in the form of dots or lines. When the exposure beam is vertically incident to the photomonomer layer, dots will result. When the exposure beam is incident to the photomonomer layer with an angle of incidence less than 90°, lines will result.

In some embodiments, the polymerized cross-linkable photomonomer is selected from the group consisting of polyurethanes, epoxies, acrylics, phenolic resins, urea-formaldehyde resins, phenol-formaldehyde resins, urethanes, siloxanes, and combinations thereof. In some embodiments, the polymerized cross-linkable photomonomer is derived from one or more ethylenically unsaturated precursors selected from the group consisting of ethylene, substituted olefins, halogenated olefins, 1,3-dienes, styrene, α-methyl styrene, vinyl esters, acrylates, methacrylates, acrylonitriles, acrylamides, N-vinyl carbazole, N-vinyl pyrolidone, and oligomers or combinations thereof.

The surface-textured layer may be a coating or part of a coating. Alternatively, or additionally, the surface-textured layer may be an outer layer of a structural object, or an outer layer of a freestanding object, or some other layer or region.

The surface-textured layer may be a transparent, antiglaring layer. The surface-textured layer may include hydrophilic molecules attached to functional groups, which allows the surface-textured layer to be a superhydrophilic layer. The surface-textured layer may include hydrophobic molecules attached to functional groups, which allows the surface-textured layer to be a superhydrophobic layer. When the surface-textured layer further comprises hydrophobic colloidal particles, the surface-textured layer can be an anti-icing layer.

In some variations, the invention provides a surface-textured layer produced by a method comprising:

(a) applying a cross-linkable photomonomer layer to a reflective substrate;

(b) exposing the photomonomer layer to an exposure beam of photons, to initiate polymerization in a plurality of first microdomains, wherein the exposure beam is a substantially collimated beam with no spatial variation;

(c) continuing to apply the exposure beam to increase cross-link density associated with first microdomains, and to cause at least some polymerization in a plurality of second microdomains that are also within the photomonomer layer but spatially separated from the first microdomains; and (d) recovering a surface-textured layer comprising the first microdomains and the second microdomains, wherein the first microdomains have a higher average cross-link density than that of the second microdomains.

DETAILED DESCRIPTION OF EMBODIMENTS OF THE INVENTION

Figure 1:
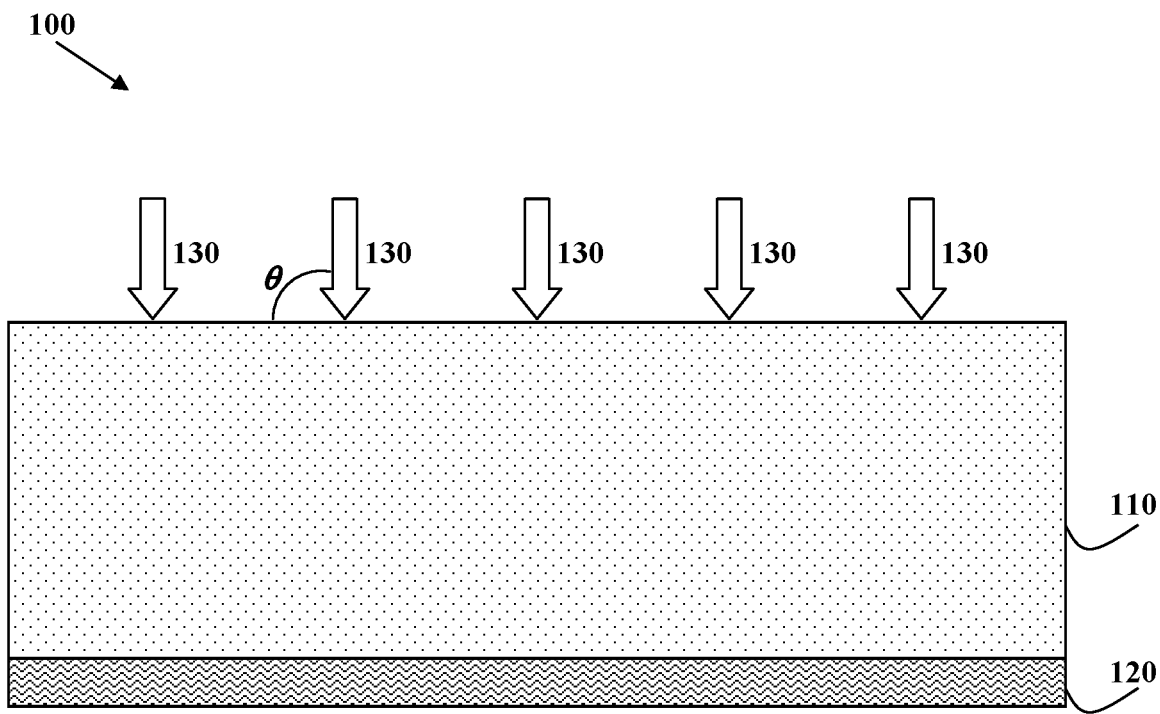
FIG. 1 is a schematic of a set-up for fabricating a surface-textured layer starting with a photomonomer layer, according to some embodiments of the invention.

The compositions, apparatus, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Some variations of the invention are premised on the surprising discovery of a new approach to fabricate structured surface topologies for functional coatings. The surface structure of these coatings may be formed by exposing a pre-polymeric photomonomer (i.e., photosensitive resin) on a reflective surface to a single collimated beam of light. After exposure to light to cause polymerization of the photomonomer, the polymer film is briefly rinsed in a solvent to remove unreacted monomer and/or polymer material with lower cross-link density. This direct approach differs from other known techniques to form structured surfaces in that it does not require a photomask or other master pattern (to create patterned light), does not require coherent or polarized light, and does not require any filler particles to create the surface pattern or texture. This technique to fabricate surface structures is non-intuitive and unexpected. Avoiding the need for precision lithographic equipment (either a light pattern or a physical mold), or filler particles, is economically attractive.

In addition, the coating can be fabricated with functional groups at the top surface. From these functional groups, it is possible to anchor molecules and colloids to the surface, further tailoring the chemical and physical properties of the coatings. Surface properties can be tailored simply by attaching different molecules.

In some variations, with reference to FIG. 1, the invention provides a method to fabricate a surface-textured layer 100, the method comprising:

(a) applying a cross-linkable photomonomer layer 110 to a substrate 120, wherein the substrate 120 is preferably reflective;

(b) exposing the photomonomer layer 110 to an exposure beam 130 of photons, to initiate polymerization in a plurality of first microdomains, wherein the exposure beam 130 is a substantially collimated beam with no spatial variation, and wherein Bis the angle of incidence of the exposure beam to the photomonomer layer;

(c) continuing to apply the exposure beam 130 to increase cross-link density associated with first microdomains, and to cause at least some polymerization in a plurality of second microdomains that are also within the photomonomer layer 110 but spatially separated from the first microdomains; and (d) recovering a surface-textured layer 100 comprising the first microdomains and the second microdomains, wherein the first microdomains have a higher average cross-link density than that of the second microdomains.

In some embodiments, the exposure beam is vertically incident to the photomonomer layer (angle θ=90° in FIG. 1). In other embodiments, the exposure beam is incident to the photomonomer layer with an angle of incidence Bless than 90°, such as about 85°, 80°, 75°, 70°, 65°, 60°, 55°, 50°, 45°, 40°, 35°, 30°, 25°, 20°, 15°, 10°, or 5° (θ>0 is necessary for photon exposure to the surface). When the exposure beam is vertically incident to the photomonomer layer, the resulting first microdomains will be in the form of "dots" or approximately round two-dimensional regions on the surface. See FIG. 2 for an example of a dotted texture, in which the first microdomains and the second microdomains are disposed in a peak-valley surface topology. When the angle of incidence Bis less than 90°, the resulting first microdomains will be in the form of "lines" or elongated two-dimensional regions on the surface. These lines result from an increased cross-link density over a length span from a point at which a beam enters the monomer layer to a distal point from which a reflected beam exits the layer.

Collimated light is light whose rays are parallel, and therefore will spread minimally as it propagates. In FIG. 1, the exposure beam 130 is substantially collimated. A "substantially collimated beam" means that the collimated beam will disperse minimally with distance. Light can be collimated by a number of techniques, such as with a collimator.

The substantially collimated beam has no spatial variation, i.e. the exposure beam 130 is a single beam of photons (e.g., light). There is preferably no diffraction grating, photomask, or other master pattern placed between the beam source and the photomonomer layer. It will be understood that at the quantum-mechanical level, light contains variations at least due to quantum uncertainty, tunneling, and so forth; "no spatial variation" as intended herein refers to macroscopic, device-scale measurements. In some embodiments, there is spatial variation in the exposure beam; however, no beam variation is necessary to produce textured surfaces.

Without being limited by speculation or theory, when a cross-linking photomonomer is exposed to incident energy that will initiate polymerization, the monomer may begin to preferentially gel in localized regions. This results in highly cross-linked microdomains that are linked together by a polymer matrix with a lower cross-link density. In some instances, depending on the chemical composition of the monomer, phase separation can occur, resulting in chemical differences between the gel regions and the surrounding polymer. See Matsumoto, "Free-radical crosslinking polymerization and copolymerization of multivinyl compounds," *Advances in Polymer Science*, Vol. 123 (1995), which is hereby incorporated by reference for its teaching of the gelation phenomenon that can occur in cross-linking monomer, and for its description of multivinyl compounds which may be utilized herein as photomonomers.

Again without being limited by speculation or theory, it is hypothesized that initial exposure of photomonomer film to a collimated beam can initiate microgel sites within the liquid photomonomer layer. These microgel sites have a higher cross-link density than the surrounding monomer/polymer, which leads to a higher localized refractive index. The higher refractive index at the microgel site may act as a lens. The focused energy from the incident beam leads to initial "waveguide" formation in the direction of the incident (primary) beam, where the refractive index of the waveguide is higher than the surrounding monomer/polymer. U.S. Pat. No. 7,382,959 to Jacobsen is hereby incorporated by reference herein for its description of mechanisms involving waveguide formation.

A cross-link is a bond that links one polymer chain to another. Cross-link bonds can be covalent bonds or ionic bonds. When polymer chains are linked together by cross-links, they lose some of their ability to move as individual polymer chains. Cross-links are the characteristic property of thermosetting plastic materials. In most cases, cross-linking is irreversible.

Cross-link density can be expressed by the average molecular weight between cross-links. The cross-link density can be measured or characterized in a number of ways, including (but not limited to) dynamic mechanical analysis, equilibrium swelling, NMR spectroscopy, and dielectric measurements.

Cross-linking is often measured by swelling experiments. The cross-linked sample is placed into a good solvent at a specific temperature, and either the change in mass or the change in volume is measured. The more cross-linking, the less swelling is attainable. Based on the degree of swelling, the Flory Interaction Parameter (which relates the solvent interaction with the sample), and the density of the solvent, the theoretical degree of cross-linking can be calculated according to Flory's Network Theory (see Flory, Principles of Polymer Chemistry, 1953).

Generally speaking, cross-link density will correlate with the extent of reaction for polymerization of photomonomer (cross-linkable monomer). The extent of reaction X can be defined as the conversion (consumption) of photomonomer, which is bounded from 0 to 100%. Within the first and second microdomains, individual extents of reaction $X_1$ and $X_2$, respectively, can be defined to characterize the average conversion (consumption) of photomonomer within those microdomains. In some embodiments, the first microdomains have a conversion of photomonomer $X_1$ of at least about 50%, 60%, 70%, 80%, 90%, 95%, or higher. In these embodiments, the second microdomains have a conversion of photomonomer $X_2$ of at least about 10%, 20%, 30%, 40%, 50%, 60%, 70%, or 80%, for example. Because first microdomains have a higher average cross-link density compared to the second microdomains, $X_1 > X_2$. In various embodiments, the difference between $X_1$ and $X_2$ is from about 1% to about 50%, such as about 2% to about 25% or about 3% to about 10%.

While photomonomer is being converted to polymer, a gel is formed first, followed by a solid material as the photomonomer conversion is further increased to cross-link chains together. A "gel" is a solid, jelly-like material that can have properties ranging from soft and weak to hard and tough. Gels exhibit no flow when in the steady-state. By weight, gels are mostly liquid, yet they behave like solids due to a three-dimensional cross-linked network within the liquid. Gels are a dispersion of molecules of a liquid within a solid in which the solid is the continuous phase and the liquid is the discontinuous phase. In some embodiments of the invention, the gel point occurs at a photomonomer conversion of about 25% to about 75%, such as about 30% to about 50%. The first microdomains should have a photomonomer conversion higher than the gel point. In some embodiments, the second microdomains have a photomonomer conversion also higher than the gel point, but that is not necessary, as unreacted photomonomer can be washed away.

Cross-link density and extent of reaction will also typically correlate with the refractive index of the material as it is being polymerized and cross-linked. We can define $\Delta n_1$ and $\Delta n_2$ as the change in refractive index from the starting monomer liquid to the first and second microdomains, respectively. Because first microdomains have a higher average cross-link density compared to the second microdomains, $\Delta n_1 > \Delta n_2$.

In some embodiments, the first microdomains, when formed, have $\Delta n_1$ of about 0.01, 0.02, 0.03, 0.04, 0.05, 0.06, 0.07, 0.08, 0.09, 0.10, or more. In some embodiments, the second microdomains, when formed, have $4n_2$ of about 0.005, 0.01, 0.02, 0.03, 0.04, or 0.05, for example. In various embodiments, the difference between $\Delta n_1$ and $\Delta n_2$ is from about 0.001, 0.002, 0.003, 0.004, 0.005, 0.01, 0.02, 0.03, 0.04, 0.05 or higher. Note that this difference equates to $n_1 - n_2$, which is the difference between average refractive index of the first microdomains and average refractive index of the second microdomains, since the refractive index of the starting monomer is the same.

Therefore in this description, when comparing the first microdomains to the second microdomains, "higher cross-link density" means equivalently higher extent of reaction (photomonomer conversion) or higher change in refractive index.

In some embodiments, the method further comprises removing unreacted photomonomer layer following step (b) and/or following step (c). In these or other embodiments, the method further includes removing at least a portion of the second microdomains following step (c). Chemical means, physical means, or a combination thereof may be used. Unreacted photomonomer may be removed by various means, such as solvent extraction, monomer vaporization, inert gas sweep, or physical displacement. Second microdomains may also be removed by various means, such as solvent extraction, hydrolysis, degradation/vaporization, or physical displacement, for example. Generally speaking, the second microdomains, containing polymer, will be more difficult to remove than unreacted photomonomer.

In certain embodiments, the method further comprises rinsing out at least some unreacted photomonomer layer and/or at least some of the second microdomains, using an effective solvent, to produce a transparent, anti-glaring surface-textured layer. Preferably, most or all of the unreacted photomonomer is removed by introducing a solvent, allowing the photomonomer to dissolve into the solvent, and then rinsing or washing away the solvent. Some embodiments remove the unreacted photomonomer but not any of the second microdomains. Other embodiments remove the unreacted photomonomer and some, most, or all of the second microdomains.

Reactive functional groups remain within the photomonomer layer following step (c), in some variations. When functional groups are present, further chemistry may be carried out for desired surface properties. For example (as further discussed below), hydrophilic molecules may be attached to the reactive functional groups to produce a superhydrophilic surface-textured layer. In some embodiments, superhydrophobic molecules may be attached to the reactive functional groups to produce a superhydrophobic surface-textured layer. Hydrophobic colloidal particles may be attached to the reactive functional groups to produce an anti-icing surface-textured layer.

The thickness of the surface-textured layer, in various embodiments, may be about 5 μm or more, such as about 10 μm, 15 μm, 20 μm, 25 μm, 50 μm, 100 μm, 150 μm, 200 μm, 250 μm, 400 μm, 500 μm, or more. In some embodiments, the thickness of the surface-textured layer is from about 10 μm to about 100 μm, such as from about 25 μm to about 75 μm. The thickness of the surface-textured layer may be calculated as the distance from the substrate layer to the top of the first microdomains (on average), for example. Alternatively, the thickness of the surface-textured layer may be calculated as the average actual thickness from the substrate layer to the top of the coating surface.

These methods allow for rapid throughput to produce coatings. The surface-textured layer may be formed in seconds with minimal post-processing required. In some embodiments, the surface-textured layer is formed in about 1 second to about 10 minutes, such as about 5 seconds to about 2 minutes, or about 10 seconds to about 1 minute.

The surface-textured layer that is produced by these methods may be a coating itself, or may be part of a coating. In some embodiments, the surface-textured layer is an outer layer of a structural object or a freestanding object. In principle, the surface-textured layer could be an internal layer of a coating or object, or multiple surface-textured layers could be produced in a multilayer coating or object. The surface-textured layer may be a surface structure over a large area, and it may be flat, curved, or otherwise conforming to the shape of the object or part being coated.

In some embodiments, more than one layer is present in a coating or object. A multiple-layer structural coating offers a repeating, self-similar structure that allows the coating to be abraded during use while retaining anti-wetting and anti-icing properties (or other properties). Should the surface be modified due to environmental events or influences, the self-similar nature of the structural coating allows the freshly exposed surface to present a coating identical to that which was removed. The number of layers in a structural coating may be, for example, 1, 2, 3, 4, 5, or more. A single layer, of sufficient thickness, may also consist of a self-similar structure that allows the coating to be abraded during use while retaining anti-wetting and anti-icing properties.

The present invention provides unique surface-textured layers. In some variations, a surface-textured layer comprising first microdomains and second microdomains is provided, wherein the surface-textured layer is characterized in that: the first and the second microdomains contain polymerized cross-linkable photomonomer;

the first microdomains have a higher average cross-link density than that of the second microdomains;

the first microdomains and the second microdomains are disposed in a peak-valley surface topology;

the surface-textured layer has a non-uniform or semi-uniform texture pattern; and the surface-textured layer contains essentially no filler particles.

The non-uniform or semi-uniform texture pattern may be random (i.e., non-ordered), or there may be some degree of uniformity in texture across the surface. However, the methods disclosed herein will not lead to perfect uniformity in the surface. Thus a surface texture pattern within any selected 1 $mm^2$ area is unique and distinct from any other 1 $mm^2$ area, as measured by the width, height, shape, and/or spacing of surface features (e.g., dots or lines) present.

In some embodiments, the first microdomains have an average length scale (e.g., dot diameter or line width) from about 0.1 μm to about 100 μm, such as from about 1 μm to about 25 μm, or about 2, 3, 4, 5, 6, 7, 8, 9, 10, 15, or 20 μm. In these or other embodiments, the second microdomains have an average length scale (e.g., distance between adjacent dots or lines) from about 0.1 μm to about 100 μm, such as from about 1 μm to about 10 μm, or about 2, 3, 4, 5, 6, 7, 8, 9, 10, 15, or 20 μm.

The peak-valley surface topology, in some embodiments, includes first microdomains having a first-microdomain average peak height of about 0.01 µm to about 50 µm relative to a second-microdomain average valley depth. This number is the average distance from top of peak to bottom of valley, not to the substrate, since there is some amount of polymer present even in the valleys. In certain embodiments, the first-microdomain average peak height is about 0.1 µm to about 20 µm relative to the second-microdomain average valley depth, such as about 0.2, 0.5, 1, 2, 3, 4, 5, 6, 7, 8, 9, 10, 11, 12, 13, 14, or 15 µm.

The first microdomains may be substantially in the form of dots or lines. When the exposure beam is vertically incident to the photomonomer layer, dots will result. When the exposure beam is incident to the photomonomer layer with an angle of incidence less than 90°, lines will result.

In some embodiments, the polymerized cross-linkable photomonomer is selected from the group consisting of polyurethanes, epoxies, acrylics, phenolic resins, urea-formaldehyde resins, phenol-formaldehyde resins, urethanes, siloxanes, and combinations thereof. In some embodiments, the polymerized cross-linkable photomonomer is derived from one or more ethylenically unsaturated precursors selected from the group consisting of ethylene, substituted olefins, halogenated olefins, 1,3-dienes, styrene, α-methyl styrene, vinyl esters, acrylates, methacrylates, acrylonitriles, acrylamides, N-vinyl carbazole, N-vinyl pyrolidone, and oligomers or combinations thereof.

The surface-textured layer may be a coating or part of a coating. Alternatively, or additionally, the surface-textured layer may be an outer layer of a structural object, or an outer layer of a freestanding object, or some other layer or region.

The surface-textured layer may be a transparent, anti-glaring layer. The surface-textured layer may include hydrophilic molecules attached to functional groups, which allows the surface-textured layer to be a superhydrophilic layer. The surface-textured layer may include hydrophobic molecules attached to functional groups, which allows the surface-textured layer to be a superhydrophobic layer. When the surface-textured layer further comprises hydrophobic colloidal particles, the surface-textured layer can be an anti-icing layer.

Optionally, the surface-textured layer may further comprise one or more additives selected from the group consisting of colorants, UV absorbers, defoamers, plasticizers, viscosity modifiers, density modifiers, catalysts, and scavengers.

While the surface-textured layer is primarily functional in nature, as described above, optionally the layer may be decorated, colored, stamped, or otherwise modified with ornamental features. For example, a brand name or trademark may be printed on the layer, or different types of layers (e.g., superhydrophobic versus superhydrophilic) may be color-coded for identification and quality control.

In some variations, the invention provides a surface-textured layer produced by a method comprising:

(a) applying a cross-linkable photomonomer layer to a reflective substrate;

(b) exposing the photomonomer layer to an exposure beam of photons, to initiate polymerization in a plurality of first microdomains, wherein the exposure beam is a substantially collimated beam with no spatial variation;

(c) continuing to apply the exposure beam to increase cross-link density associated with first microdomains, and to cause at least some polymerization in a plurality of second microdomains that are also within the photomonomer layer but spatially separated from the first microdomains;

(d) recovering a surface-textured layer comprising the first microdomains and the second microdomains, wherein the first microdomains have a higher average cross-link density than that of the second microdomains; and (e) optionally removing unreacted photomonomer and at least some of the second microdomains.

In one embodiment, a structured surface is formed by exposing a film of photomonomer on a reflective surface to a single collimated beam that will initiate polymerization. Typically, the photomonomer will polymerize when exposed to UV light (~365 nm), although photoinitiators may be used to initiate polymerization when exposed to other wavelengths, such as in the visible spectrum. Exemplary photoinitiators include peroxides, oxygen, nitrogen dioxide, azobisisobutyronitrile, or camphorquinone.

Irrespective of the incident wavelength, no mask or patterned exposure is required. That is, there is preferably no spatial variation in the exposure beam, as explained above.

The beam of photons will be reflected from the reflective substrate back up through the monomer/polymer layer. The intensity of the reflected beam (secondary beam) is a function of the intensity of the incident collimated beam (primary beam), the attenuation coefficient of the photomonomer, and the substrate material. The optimum intensity of the reflected beam is dependent on the polymerization kinetics and can vary between about 1% and 100% of the incident (primary) beam intensity.

If the incident beam is normal to the substrate, the modulation in the refractive index results in a dotted texture. If the film is rinsed with an appropriate solvent (e.g., water, acetone or other ketones, isopropyl alcohol or other alcohols, toluene oro other hydrocarbons, organic acids, acetates, etc.), the regions with the lower refractive index, and lower cross-link density, will be removed at a faster rate. This leads to a peak-valley surface topology as shown in FIG. 2. The peak heights can be several micrometers and peak-to-peak distances can range from a few micrometers to several tens of micrometers, for example. The peak height may be altered by adjusting the rinsing time and/or selecting a more aggressive or less aggressive solvent, in addition to control of the initial polymerization and formation of microdomains.

Figure 2A:
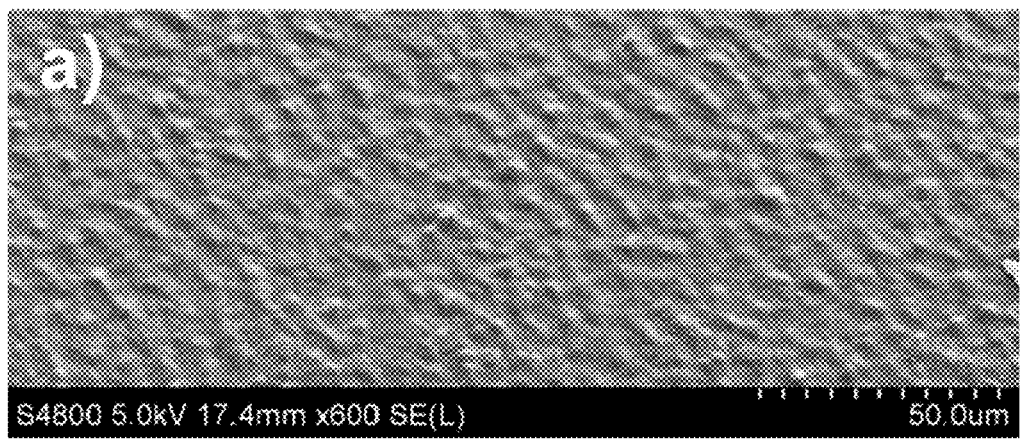
FIG. 2A is an exemplary scanning electron microscopy image of the surface structure of a coating fabricated by exposing photomonomer film with light.
Figure 2B:
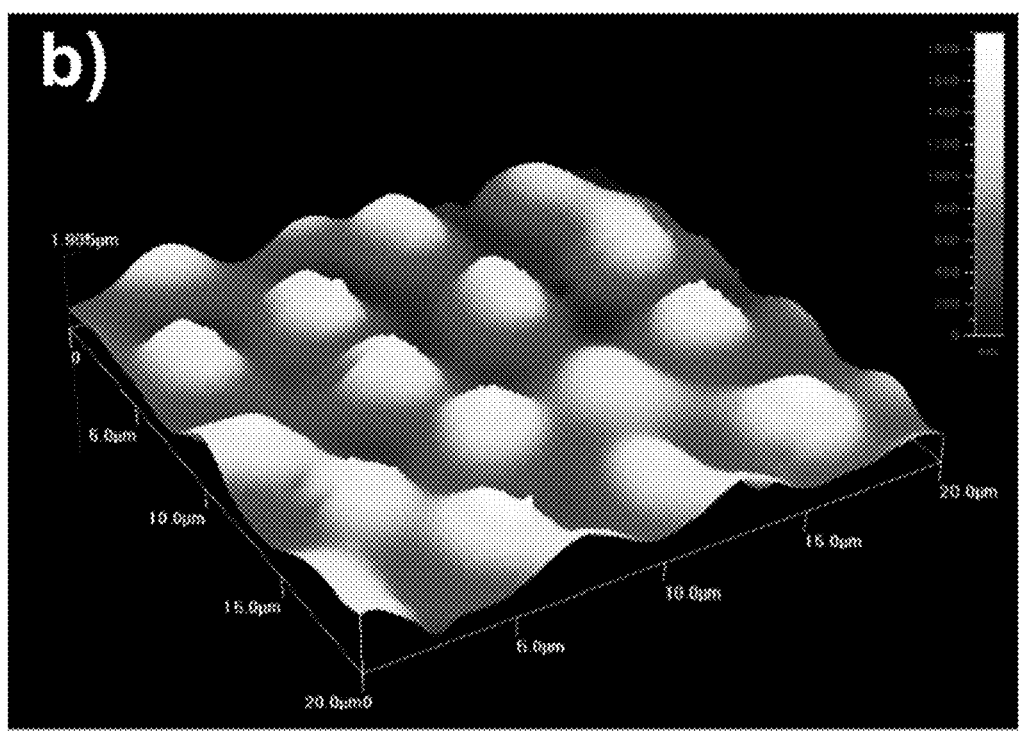
FIG. 2B is an exemplary atomic force microscopy image of the surface structure of a coating fabricated by exposing photomonomer film with light.
Figure 2C:
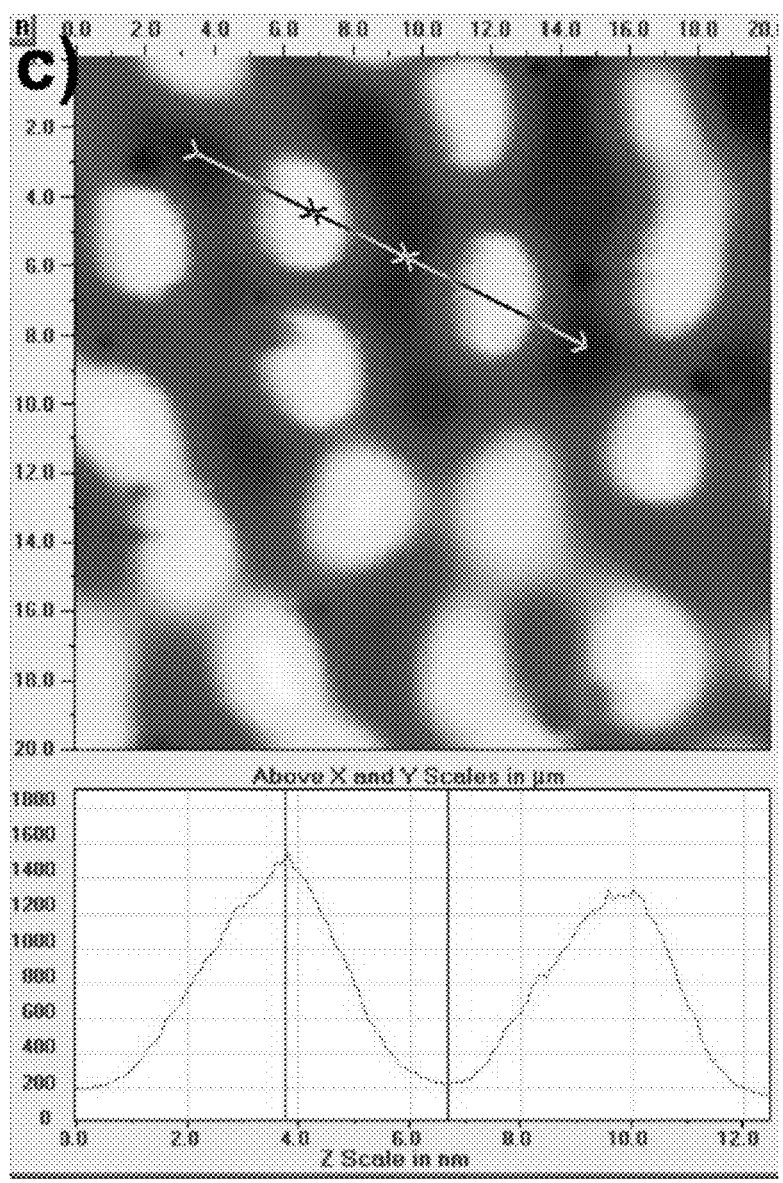
FIG. 2C is an exemplary atomic force microscopy image of the surface structure of a coating fabricated by exposing photomonomer film with light, showing both lateral (x- and y-scale) and height (z-scale) measurements.

FIG. 2A shows a scanning electron microscopy image of the surface structure of a coating fabricated by exposing photomonomer film with light. FIGS. 2B and 2C show atomic force microscopy images of the surface structure of a coating fabricated by exposing photomonomer film with light.

The reflective substrate (onto which a cross-linkable photomonomer layer is applied) may be any substrate material that reflects at least part of the beam of photons back up through the photomonomer layer. The reflective substrate material may be a mirror, a polished metal (such as aluminum or silver), a metal alloy, a reflective glass, a reflective film (e.g., a silicone-based film), a reflective fabric, a reflective tape, or a combination thereof. The thickness of the substrate layer is not limited but may be from about 0.1 µm to about 1 cm, such as from about 10 µm to about 1 mm.

In an alternative embodiment, the substrate is not a reflective substrate, or at least does not reflect the entire beam of photons. In this embodiment, a second beam of photons may be injected from the substrate side, through the photomonomer layer. This technique can simulate beam reflection. Also this technique may be employed to supplement reflected photons, enhancing polymerization kinetics and modifying microdomain formation.

The photomonomer composition may be modified so that excess (unreacted) functional chemical groups are available after the polymerization event. Among others, such groups may include thiols, carboxylic acids, hydroxyls, and/or amines. Using various chemical bond formation reactions, molecules and nanometer-sized colloids may be attached onto these free functional groups. Attachment of selected molecules can be used to conveniently tailor the overall surface properties. Properties such as anti-reflective, anti-icing, superhydrophobic, superhydrophilic, de-wetting, and self-cleaning arise from the combination of the chemical nature of the surface as well as its structure (topology).

Figure 3:
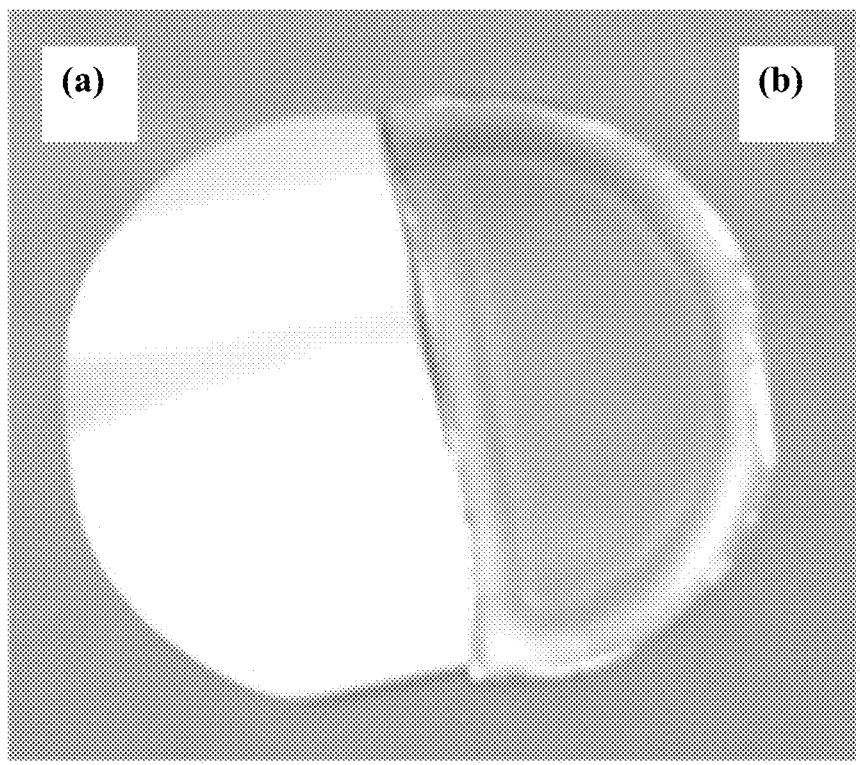
FIG. 3 is a photograph showing a silicon wafer without a surface-textured coating, labeled (a) on the left side, compared to the silicon wafer with an anti-glaring surface-textured coating on the right side, labeled (b), provided by some embodiments.
Figure 4:
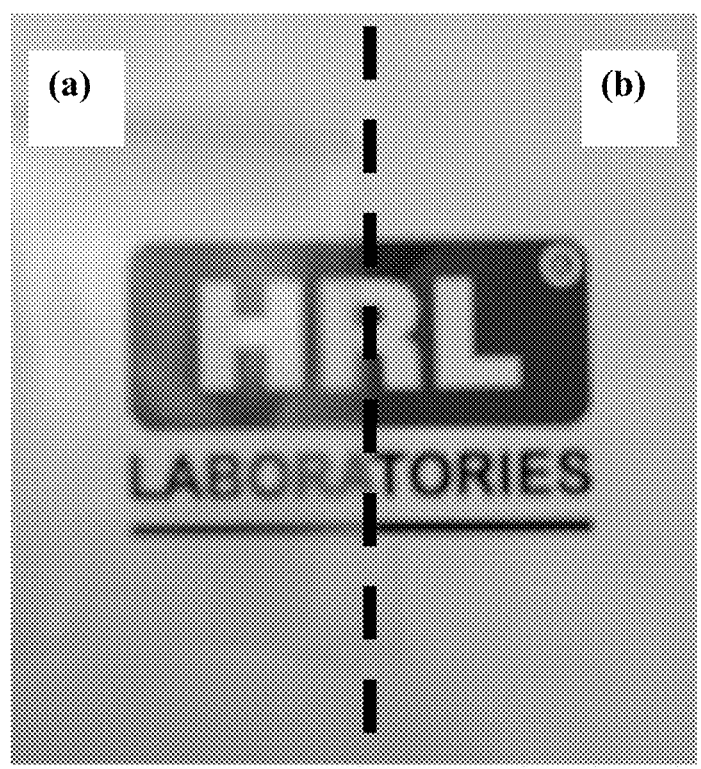
FIG. 4 is a photograph showing an exemplary free-standing transparent anti-glaring film on top of an HRL logo, labeled (a) on the left side, compared to the right side, labeled (b), which does not include the anti-glaring film.

For example, rinsing a surface structure such as that shown in FIG. 2 with acetone, toluene, or isopropyl alcohol will result in a transparent, anti-glaring surface. When light strikes such a surface, the light is diffusely reflected, giving an anti-glaring matte surface effect without any filler particles, even at strong light illumination intensities. Illustrations of this effect are shown in FIGS. 3 and 4, which are each photographs demonstrating an anti-glaring effect and transparency. In FIG. 3, a silicon wafer is shown on the left side (a) without a surface-textured coating, and on the right side (b) with an anti-glaring surface-textured coating. In FIG. 4, on the left side (a), a free-standing transparent anti-glaring film is present on top of the HRL logo, while the right side (b) does not include the anti-glaring film. For anti-glaring and transparent surfaces, there may be (but is not necessarily) reaction of functional groups to modify surface chemical properties.

Figure 5:
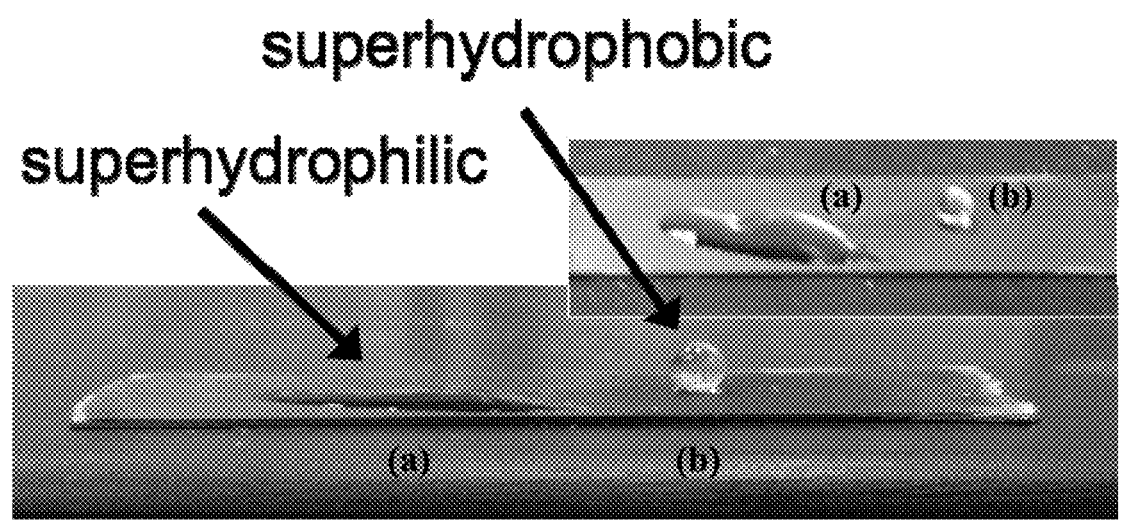
FIG. 5 is a photograph of water droplets on top of exemplary surface-structured coatings. Label (a) demonstrates that the coating may be made superhydrophilic, while label (b) demonstrates that the coating may be made superhydrophobic, in certain embodiments of the invention.

The combination of the surface structure such as that shown in FIG. 2 with hydrophilic surface molecules results in a superhydrophilic surface. When a drop of water is placed onto such a superhydrophilic surface, its contact angle is very small (approaching zero). An illustration of this effect is shown in FIG. 5, specimen (a). FIG. 5 shows a photograph of water droplets on top of surface-textured coatings, which may be rendered (a) superhydrophilic by attaching hydrophilic molecules to functional chemical surface groups. For superhydrophilic surfaces, there may be (but is not necessarily) removal of unreacted monomer or polymer regions or lower cross-link density.

The combination of the surface structure such as that shown in FIG. 2 with hydrophobic surface molecules results in a superhydrophobic surface. When a drop of water is placed onto such a superhydrophobic surface, its contact angle is very large (above 150°). The water is minimizing its contact with the substrate, as shown in FIG. 5, specimen (b). FIG. 5 also shows a photograph of water droplets on top of surface-textured coatings, which may be rendered (b) superhydrophobic by attaching hydrophobic molecules to functional chemical surface groups. Such surfaces are used in de-wetting and self-cleaning applications (such as "artificial Lotus leafs"). For superhydrophobic surfaces, there may be (but is not necessarily) removal of unreacted monomer or polymer regions or lower cross-link density.

The combination of surface structure such as that shown in FIG. 2 with hydrophobic surface colloidal particles results in an anti-icing surface. When a drop of water is placed onto such an anti-icing surface, its freezing point is lowered. For example, when a sample with a surface structure such as that shown in FIG. 2 is combined with colloidal silica-octyl nanoparticles, a water droplet on its surface shows freezing points as low as $-13°$ C. For anti-icing surfaces, there may be (but is not necessarily) removal of unreacted monomer or polymer regions or lower cross-link density.

For water to freeze into ice, a water droplet must reach the surface and then remain on the surface for a time sufficient for ice nucleation and water solidification. The present invention can render it more difficult for water to remain on the surface, while increasing the time that would be necessary for water, if it does remain on the surface, to then form ice.

As used herein, an "anti-icing" (or equivalently, "icephobic") surface or material means that the surface or material, in the presence of liquid water or water vapor, is characterized by the ability to (i) depress the freezing point of water (normally 0° C. at atmospheric pressure) and (ii) delay the onset of freezing of water at a temperature below the freezing point.

Note that in this specification, reference may be made to water "droplets" but that the invention shall not be limited to any geometry or phase of water that may be present or contemplated. Similarly, "water" does not necessarily mean pure water. Any number or type of impurities or additives may be present in water, as referenced herein.

The anti-wetting property of the coating may be created, at least in part, by surface roughness (arising from the peak-valley topology) that increases the effective contact angle of water with the substrate as described in the Cassie-Baxter equation:

$$\cos \theta_{\mathit{eff}} = \phi_{\mathit{solid}}(\cos \theta_{\mathit{solid}} + 1) - 1$$

where $\theta_{\mathit{eff}}$ is the effective contact angle of water, $\phi_{\mathit{solid}}$ is the area fraction of solid material when looking down on the surface, and $\theta_{\mathit{solid}}$ is the contact angle of water on a hypothetical non-porous flat surface formed from the materials in the coating. A water-air interface at the droplet surface is assumed, giving rise to the extreme contact angle of 180° associated with air (cos 180°=−1). A hydrophilic surface results when $\theta_{\mathit{eff}} < 90°$, whereas a hydrophobic surface results when $\theta_{\mathit{eff}} > 90°$. A superhydrophobic surface results when $\theta_{\mathit{eff}} \geq 150°$.

By creating a hydrophobic material through reaction with functional groups (large $\theta_{\mathit{solid}}$) and creating effective surface porosity from the peaks and valleys (small $\theta_{\mathit{solid}}$), the effective contact angle $\theta_{\mathit{eff}}$ will be maximized. Minimization of $\theta_{\mathit{solid}}$ and maximization of $\theta_{\mathit{solid}}$ act to reduce the liquid-substrate contact area per droplet, reducing the adhesion forces holding a droplet to the surface. As a result, water droplets impacting the surface can bounce off cleanly. This property not only clears the surface of water but helps prevents the accumulation of ice in freezing conditions (including ice that may have formed homogeneously, independently from the surface). It also reduces the contact area between ice and the surface to ease removal.

In some variations of the present invention, an anti-icing structural coating may be designed to repel water as well as inhibit the solidification of water from a liquid phase (freezing), a gas phase (deposition), and/or an aerosol (combined freezing-deposition). Preferably, anti-icing structural coatings are capable of both inhibiting ice formation and of inhibiting wetting of water at surfaces. However, it should be recognized that in certain applications, only one of these properties may be necessary.

Highly textured surfaces with low liquid-substrate contact areas will slow the onset of freezing of droplets on a surface by reducing conductive heat transfer to freezing substrates. The transport of heat by conduction is reduced (slower rate) when there are gaps between the water droplet and the solid substrate. Also, highly textured surfaces with low liquid-substrate contact areas will reduce the rate of heterogeneous nucleation due to fewer nucleation sites. The kinetics of heterogeneous ice formation will be slowed when there are fewer nucleation sites present.

The invention disclosed herein has various commercial and industrial applications as anti-reflective, anti-icing, superhydrophobic, superhydrophilic, de-wetting, and self-cleaning coatings. Aerospace applications involve anti-icing coatings for both passenger and unmanned aerial vehicles. Automotive applications include coatings that help reduce ice buildup on moving external parts such as louvers, coatings for car grills, and coatings for protecting radiators or heat exchangers from ice build-up. Strongly anti-wetting surfaces also have the benefit of rapidly removing dirt and debris when flushed with water for a self-cleaning property that could be of benefit to multiple automotive surfaces.

Other applications include, but are not limited to, refrigeration, roofs, wires, outdoor signs, marine vessels, power lines, wind turbines, oil and gas drilling equipment, telecommunications equipment, as well as in many commercial and residential refrigerators and freezers. The principles taught herein may be applied to self-cleaning materials, anti-adhesive coatings, corrosion-free coatings, etc.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described should provide an indication of the utility and versatility of the present invention. Other embodiments that do not provide all of the features and advantages set forth herein may also be utilized, without departing from the spirit and scope of the present invention. Such embodiments are considered to be within the scope of the invention defined by the claims.

What is claimed is:

1. A method to fabricate a surface-textured layer, said method comprising:
   (a) applying a cross-linkable photomonomer layer to a reflective substrate;
   (b) exposing said photomonomer layer to an exposure beam of photons, to initiate polymerization in a plurality of first microdomains, wherein said exposure beam is a substantially collimated beam with no spatial variation, and wherein there is no mask or photomask used during said exposing;
   (c) continuing to apply said exposure beam to increase cross-link density associated with first microdomains, and to cause at least some polymerization in a plurality of second microdomains that are also within said photomonomer layer but spatially separated from said first microdomains; and
   (d) after completion of applying said exposure beam, recovering a surface-textured layer comprising said first microdomains and said second microdomains, wherein said first microdomains have a higher average cross-link density than that of said second microdomains, wherein said surface-textured layer is further characterized in that:
   (i) said first microdomains and said second microdomains are disposed in an irregular peak-valley surface topology;
   (ii) said second microdomains are spatially separated from said first microdomains; and
   (iii) said surface-textured layer has a non-uniform or semi-uniform surface texture pattern, wherein said surface texture pattern within any selected 1 mm$^2$ area is unique and distinct from any other 1 mm$^2$ area.

2. The method of claim 1, wherein said exposure beam is vertically incident to said photomonomer layer.

3. The method of claim 1, wherein said exposure beam is incident to said photomonomer layer with an angle of incidence less than 90°.

4. The method of claim 1, said method further comprising removing unreacted photomonomer layer following step (b) or step (c).

5. The method of claim 1, said method further comprising removing at least a portion of said second microdomains following step (c).

6. The method of claim 1, said method further comprising rinsing out at least some unreacted photomonomer layer and/or at least some of said second microdomains, using an effective solvent, to produce a transparent, anti-glaring surface-textured layer.

7. The method of claim 1, wherein reactive functional groups remain within said photomonomer layer following step (c).

8. The method of claim 7, said method further comprising attaching hydrophilic molecules to said reactive functional groups to produce a superhydrophilic surface-textured layer.

9. The method of claim 7, said method further comprising attaching superhydrophobic molecules to said reactive functional groups to produce a superhydrophobic surface-textured layer.

10. The method of claim 7, said method further comprising attaching hydrophobic colloidal particles to said reactive functional groups to produce an anti-icing surface-textured layer.

11. The method of claim 1, wherein said surface-textured layer is a coating.

12. The method of claim 1, wherein said surface-textured layer is an outer layer of a structural object or a freestanding object.

* * * * *